(12) United States Patent
Gukelberger et al.

(10) Patent No.: US 11,138,354 B2
(45) Date of Patent: Oct. 5, 2021

(54) NONUNIFORM DISCRETIZATION OF QUANTUM COMPUTING DEVICE MODEL

(71) Applicant: Microsoft Technology Licensing, LLC, Redmond, WA (US)

(72) Inventors: Jan Philipp Gukelberger, Redmond, WA (US); Andrey Antipov, Moscow (RU); Georg Wolfgang Winkler, Santa Barbara, CA (US); John King Gamble, IV, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 16/659,494

(22) Filed: Oct. 21, 2019

(65) Prior Publication Data

US 2021/0117512 A1 Apr. 22, 2021

(51) Int. Cl.
| | |
|---|---|
| *G06F 30/23* | (2020.01) |
| *G06N 10/00* | (2019.01) |
| *G06F 9/54* | (2006.01) |
| *G06F 17/16* | (2006.01) |
| *G06F 111/10* | (2020.01) |

(52) U.S. Cl.
CPC .............. *G06F 30/23* (2020.01); *G06F 9/541* (2013.01); *G06F 17/16* (2013.01); *G06N 10/00* (2019.01); *G06F 2111/10* (2020.01)

(58) Field of Classification Search
None
See application file for complete search history.

(56) References Cited

U.S. PATENT DOCUMENTS

| | | | |
|---|---|---|---|
| 2018/0246851 A1* | 8/2018 | Zaribafiyan | G06F 17/18 |
| 2019/0302107 A1* | 10/2019 | Kauffman | G16C 20/50 |
| 2020/0387578 A1* | 12/2020 | Nation | G06F 30/20 |

OTHER PUBLICATIONS

Bigaouette, et al., "Nonlinear Grid Mapping Applied to an FDTD-Based, Multi-Center 3D Schrödinger Equation Solver", In Journal of Computer Physics Communications, vol. 183, No. 1, Jan. 2012, pp. 38-45.

(Continued)

*Primary Examiner* — Craig C Dorais
(74) *Attorney, Agent, or Firm* — Alleman Hall Creasman & Tuttle LLP (57) ABSTRACT

A computing device, including memory storing a quantum computing device model. The quantum computing device model may include a plurality of quantum computing device components having a respective plurality of actual boundaries, including a boundary between a superconductor and a semiconductor. The computing device may further include a processor configured to receive, via an application-program interface (API), a nonuniform grid having a nonuniform spacing along at least a first spatial dimension. The processor may receive, via the API, a Schrödinger equation including a Hamiltonian having one or more operators. The processor may discretize the quantum computing device model using the nonuniform grid. The processor may compute a finite-difference solution estimate to the Schrödinger equation over the quantum computing device model as discretized with the nonuniform grid. The processor may output the finite-difference solution estimate via the API.

20 Claims, 7 Drawing Sheets

(56) References Cited

OTHER PUBLICATIONS

"International Search Report and Written Opinion Issued in PCT Application No. PCT/US20/054877", dated Feb. 9, 2021, 10 Pages.
Redaelli, et al., "Design of Broadband High-Efficiency Superconducting-Nanowire Single Photon Detectors", In Journal of Superconductor Science and Technology, vol. 29, No. 6, May 6, 2016, pp. 1-9.
Sasmal, "A Finite Volume Approach for Solving the Ground State Helium", In Journal of Physics B: Atomic, Molecula and Optical Physics, vol. 42, No. 22, Oct. 30, 2009, pp. 1-11.
Soriano, et al., "Analysis of the Finite Difference Time Domain Technique to Solve the Schrödinger Equation for Quantum Devices", In Journal of Applied Physics, vol. 95, No. 12, Jun. 15, 2004, pp. 8011-8018.
"Quantum Transport Simulations Made Easy", Retrieved from: https://kwant-project.org/, Retrieved Date: Sep. 11, 2019, 01 Page.
Antipov, et al., "Effects of Gate-Induced Electric Fields on Semiconductor Majorana Nanowires", In Journal of Physical Review X, vol. 8, Issue 3, Aug. 13, 2018, 19 Pages.
Grotel, et al., "Kwant 1.4.0 Documentation", Retrieved from: https://downloads.kwant-project.org/doc/latest.pdf, Mar. 6, 2019, 207 Pages.
Tan, et al., "A Self-Consistent Solution of Schrodinger-Poisson Equations Using a Nonuniform Mesh", In Journal of Applied Physics, vol. 68, Issue 8, Oct. 15, 1990, pp. 4071-4076.
Winkler, et al., "Unified Numerical Approach to Topological Semiconductor-Superconductor Heterostructures", In Journal of Physical Review B, vol. 99, Issue 24, Jun. 13, 2019, 16 Pages.

\* cited by examiner

NONUNIFORM DISCRETIZATION OF QUANTUM COMPUTING DEVICE MODEL

BACKGROUND

Research into the construction of quantum computing devices frequently involves performing computer simulations of the physical properties of quantum computing device architectures. These simulations allow quantum computing devices to be designed and optimized much more quickly than approaches that rely on frequent experimental testing of quantum computing device architectures. In order to achieve this acceleration in the quantum computing device development cycle, simulations of the quantum computing devices require high levels of accuracy and typically use large amounts of computing resources.

SUMMARY

According to one aspect of the present disclosure, a computing device is provided, including memory storing a quantum computing device model. The quantum computing device model may include a plurality of quantum computing device components having a respective plurality of actual boundaries. The plurality of actual boundaries may include a boundary between a superconductor and a semiconductor. The computing device may further include a processor configured to receive, via an application-program interface (API), a nonuniform grid having a nonuniform spacing along at least a first spatial dimension. The processor may be further configured to receive, via the API, a Schrödinger equation including a Hamiltonian having one or more operators. The processor may be further configured to discretize the quantum computing device model using the nonuniform grid. The processor may be further configured to compute a finite-difference solution estimate to the Schrödinger equation over the quantum computing device model as discretized with the nonuniform grid. The processor may be further configured to output the finite-difference solution estimate via the API.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Simulating quantum computing devices and quantum computing device components typically includes numerically solving one or more differential equations over one or more regions defined in a quantum computing device model. For example, the one or more differential equations may include one or more Schrödinger equations with respective Hamiltonians that may be set by a user based on parameters of the quantum computing device model.

The finite difference method is a numerical method of solving differential equations that is frequently used when performing quantum computing device simulations. In the finite difference method, a simulated space occupied by the simulated quantum computing device is divided into a plurality of cells using a grid. The resolution of the grid may determine the level of accuracy of the simulation. However, different materials included in a quantum computing device may require different resolution levels to simulate accurately. For example, in comparison to semiconductors or insulators, superconductors typically require higher resolutions (and thus shorter length scales) to model accurately. When a quantum computing device including a plurality of different materials is simulated at a high resolution, computing resource may be wasted when simulating materials such as semiconductors and insulators that can be simulated accurately at lower resolutions.

Figure 1:
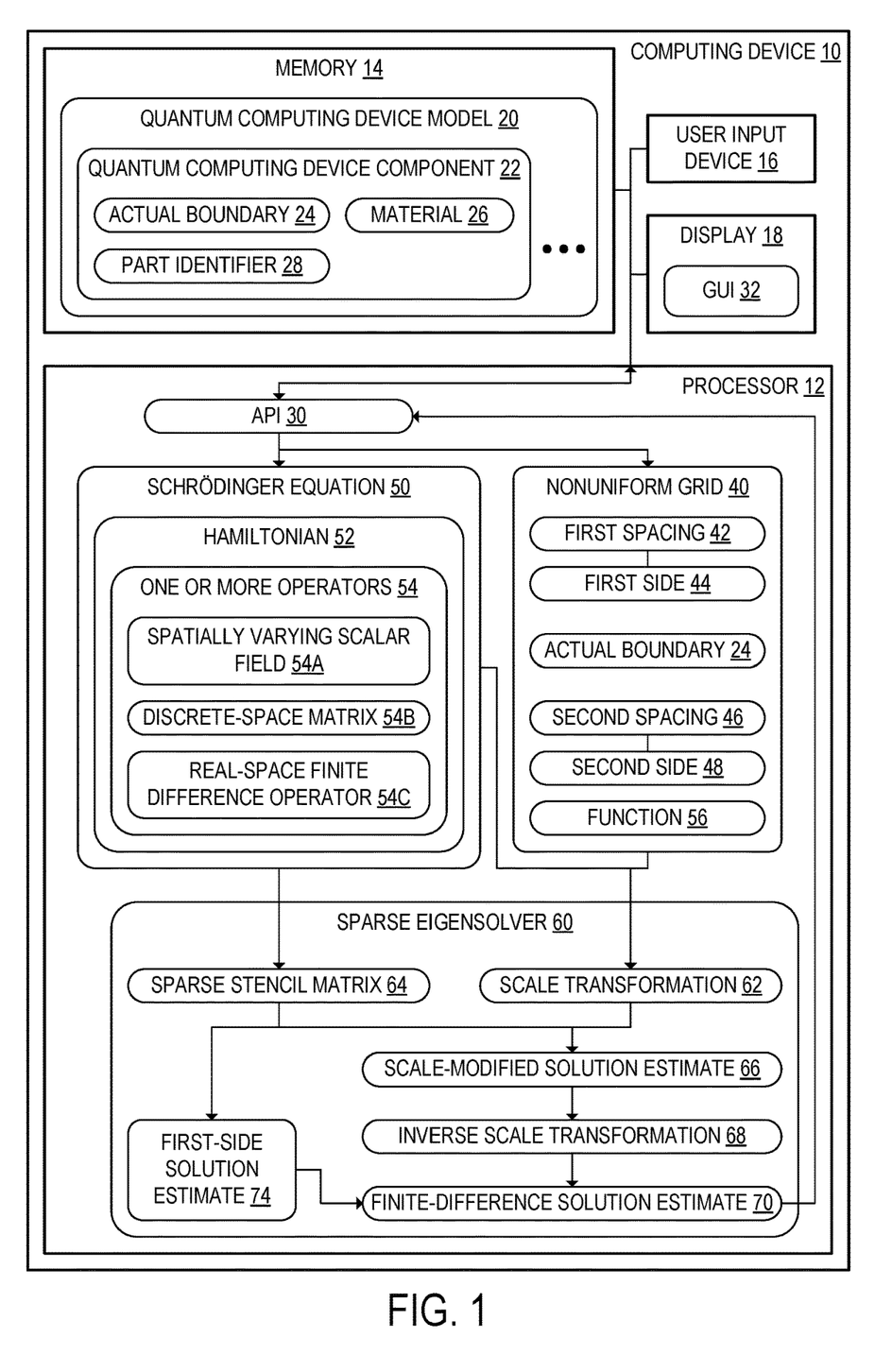
FIG. 1 schematically shows an example computing device including memory and a processor, according to one embodiment of the present disclosure.

In order to address this issue, a computing device 10 is provided, as schematically depicted in FIG. 1. The computing device 10 may include a processor 12 and memory 14, which may be operatively coupled. The processor 12 and the memory 14 may each be instantiated in one or more physical components such as one or more processor cores and/or one or more physical memory modules. The computing device 10 may further include one or more user input devices 16. In addition, the computing device 10 may further include one or more output devices, which may include a display 18. The display 18 may be configured to display a graphical user interface (GUI) 32 via which a user may view output communicated to the display 18 by the processor 12. The GUI 32 may be further configured to receive user input via the one or more user input devices 16. In some embodiments, the functions of the computing device 10 may be distributed across a plurality of communicatively coupled computing devices.

The processor 12 may be configured to execute an application-program interface (API) 30 via which inputs and outputs of a simulation of a quantum computing device are received and transmitted. The API 30 may be communicatively coupled with the GUI 32 such that the user may enter parameters of the simulation and view its results.

The memory 14 may store a quantum computing device model 20. The memory 14 of the computing device 10 may store a quantum computing device model 20, which may include a plurality of quantum computing device components 22 having a respective plurality of actual boundaries 24. For example, the quantum computing device model 20 may be a computer-aided design (CAD) model of a quantum computing device. The quantum computing device model 20 may, in some embodiments, be a one-dimensional model. In other embodiments, the quantum computing device model 20 may be a two-dimensional model of a cross-section of a quantum computing device. In other embodiments, the quantum computing device model 20 may be a three-dimensional model. The plurality of quantum computing device components 22 may be indicated in the quantum computing device model 20 as non-overlapping regions of a one-dimensional chain, a two-dimensional surface, or a three-dimensional volume.

Figure 2:
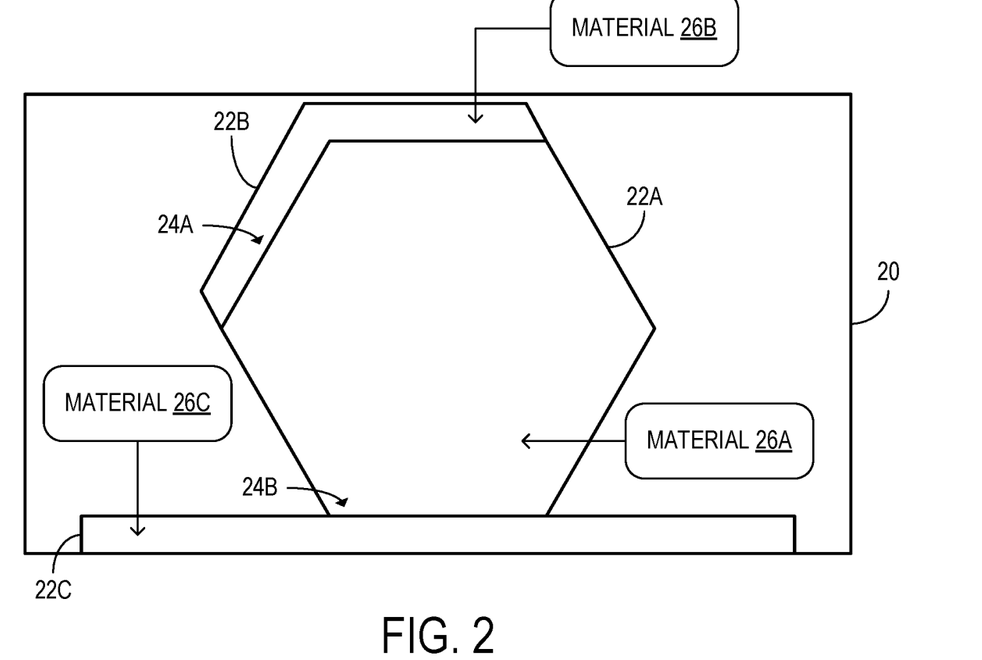
FIG. 2 shows an example quantum computing device model, according to the embodiment of FIG. 1.

An example quantum computing device model 20 is depicted in FIG. 2. In the example of FIG. 2, the quantum computing device model 20 is a two-dimensional model of a cross-section of a two-facet nanowire. The quantum computing device components 22 shown in the cross-section are a semiconductor 22A, a superconductor 22B, and a gate dielectric 22C. One of the actual boundaries 24 shown in the example of FIG. 2 is a first boundary 24A between the semiconductor 22A and the superconductor 22B. The first boundary 24A may be a location of one or more physical qubits in the modeled quantum computing device. As discussed above, discretization artifacts may occur at boundaries between semiconductors and superconductors when existing methods of modeling quantum computing devices are used. Discretization artifacts may also occur at other boundaries, such as a boundary between different semiconductors or between a semiconductor and an insulator. The quantum computing device model 20 shown in FIG. 2 includes a second boundary 24B between the semiconductor 22A and the gate dielectric 22C.

The quantum computing device model 20 may, in some embodiments, further indicate a respective material 26 of each quantum computing device component 22. In the example of FIG. 2, the material 26A of the semiconductor 22A is indium arsenide, the material 26B of the superconductor 22B is aluminum, and the material 26C of the gate dielectric 22C is hafnium dioxide.

The memory 14 may further store a respective part identifier 28 associated with each quantum computing device component 22. The memory 14 may indicate the respective materials 26 of the quantum computing device components 22 by storing a table associating each part identifier 28 with a material 26.

Figure 3:
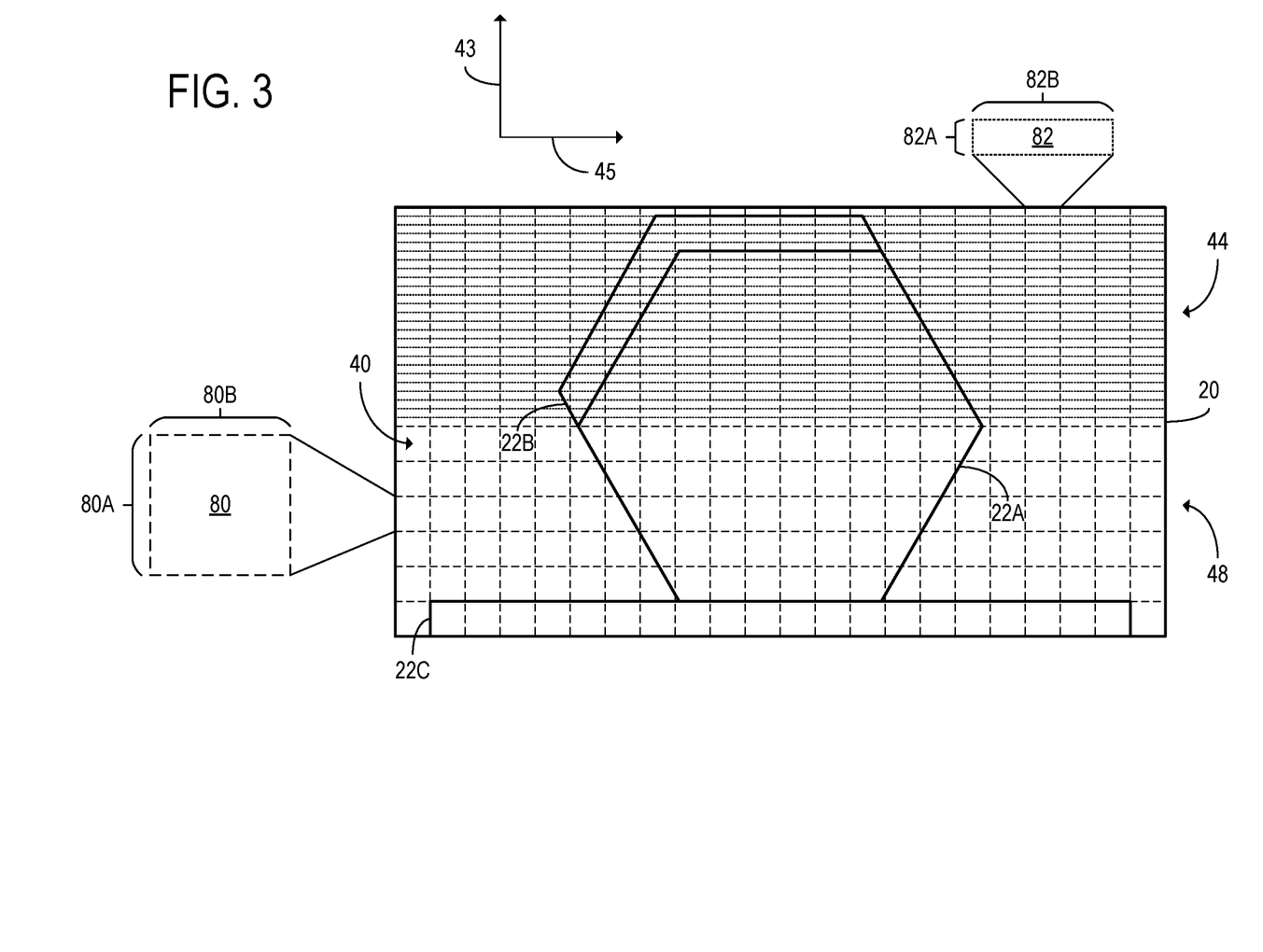
FIG. 3 shows the example quantum computing device model of FIG. 2 discretized with a nonuniform rectangular grid having a spacing that varies according to a step function.

The processor 12 may be further configured to receive a nonuniform grid 40. In some embodiments, the nonuniform grid 40 may be received via the API 30. The processor 12 may be further configured to discretize the quantum computing device model 20 using the nonuniform grid 40. FIG. 3 shows the example quantum computing device model 20 of FIG. 2 with an example nonuniform grid 40. The nonuniform grid 40 may have a nonuniform spacing along at least a first spatial dimension 43, as shown in the example of FIG. 3, in which the resolution of the nonuniform grid 40 along the first spatial dimension 43 changes at least once.

The nonuniform grid 40 shown in FIG. 3 is a nonuniform rectangular grid that includes a plurality of rectangular cells. FIG. 3 shows a first cell 80 and a second cell 82 of the nonuniform grid 40. The second cell 82 differs in size from the first cell 80. The first cell 80 has a first cell height 80A and a first cell width 80B, and the second cell has a second cell height 82A and a second cell width 82B. In the example of FIG. 3, the second cell height 82A is lower than the second cell height 80A.

In some embodiments, the nonuniform grid 40 may be uniform along at least a second spatial dimension 45. In the example of FIG. 3, the first cell width 80B is equal to the second cell width 82B. Alternatively, the nonuniform grid 40 may be nonuniform along each axis. In embodiments in which the quantum computing device model 20 is a three-dimensional model, the nonuniform grid 40 may be nonuniform along one, two, or three spatial dimensions. Further, it will be appreciated that the grid 40 itself may be one-, two-, or three-dimensional and may be non-uniform over one or more of its dimensions.

In the example of FIG. 1, the nonuniform grid 40 has a first spacing 42 on a first side 44 of an actual boundary 24 of a quantum computing device component 22 of the plurality of quantum computing device components 22. For example, the actual boundary 24 may be the first boundary 24A between the superconductor 22A and the semiconductor 22B, or the second boundary 24B between the semiconductor 22B and the gate dielectric 22C. The nonuniform grid 40 has a second spacing 46 on a second side 48 of the actual boundary 24. Thus, the nonuniform grid 40 varies according to a step function along the first spatial dimension 43 in the embodiment of FIG. 3.

Figure 4:
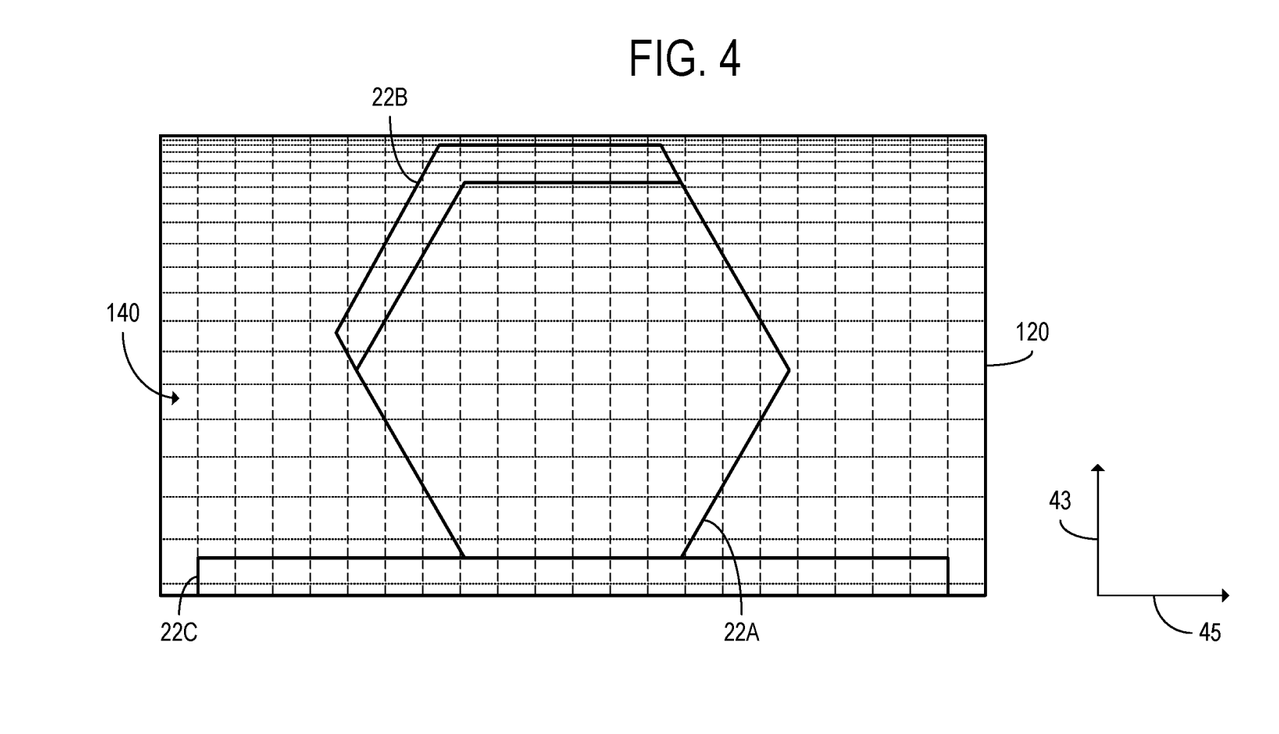
FIG. 4 shows the example quantum computing device model of FIG. 2 discretized with a nonuniform rectangular grid having a spacing that varies according to a linear function.

The nonuniform grid 40 may have a spacing that varies according to a function 56 selected from the group consisting of a step function, a linear function, an exponential function, and a logarithmic function. Other functions 56, such as a function weighted proportionally to an estimated electron density, may be used in other embodiments. FIG. 4 shows another example quantum computing device model 120 discretized according to a nonuniform grid 140. In the example of FIG. 4, the nonuniform grid 140 is a nonuniform rectangular grid with a spacing that varies along the first spatial dimension 43 according to a linear function.

Returning to FIG. 1, the processor 12 may be further configured to receive a Schrödinger equation 50 via the API 30. The Schrödinger equation 50 includes a Hamiltonian 52, which may have one or more operators 54. The processor 12 may be configured to express each operator 54 as a matrix. In some embodiments, the Hamiltonian 52 may be expressed as a product of a plurality of operators 54 including a spatially varying scalar field 54A, a discrete-space matrix 54B, and a real-space finite difference operator 54C. The discrete-space matrix 54B may be defined as a matrix encoding a wavefunction index that varies over a discrete symmetry group. For example, the discrete-space matrix 54B may encode spin. Alternatively, the discrete space of the discrete-space matrix 54B may be a particle-hole space. The real-space finite difference operator 54C may be a gradient operator, such as a second-order derivative finite difference operator. The real-space finite difference operator 54C may alternatively be a real-space first-order derivative operator. In some embodiments, the discrete-space matrix 54B and/or the real-space finite difference operator 54C may be an identity matrix.

In some embodiments, the user may specify, via the API 30, one or more of the following parameters that may be included in the Hamiltonian 52: a spatially dependent effective mass $m^*(z)$, a Fermi energy $\varepsilon_F(z)$, a spin-orbit coupling strength $\alpha(z)$, or a dimensionless magnetic moment $g(z)$. Although each of the above parameters is expressed as a function of a distance along a z axis, each of the above parameters may additionally or alternatively be expressed as a function of a distance along some other axis, or along a combination of axes.

The processor 12 may be further configured to compute a finite-difference solution estimate 70 to the Schrödinger equation 50 over the quantum computing device model 20 as discretized with the nonuniform grid 40. When the processor 12 computes the finite-difference solution estimate 70, the Hamiltonian 52 may be discretized as a sparse stencil matrix 64. When the quantum computing device model 20 is a two-dimensional model discretized with a nonuniform rectangular grid 40, the sparse stencil matrix 64 may be a sparse matrix that encodes a five-point stencil for each cell of the nonuniform rectangular grid 40. Alternatively, when the quantum computing device model 20 is a three-dimensional model, the sparse stencil matrix 64 may indicate a respective nine-point stencil for each cell. The processor 12 may be configured to generate the sparse stencil matrix 64 and compute the finite-difference solution estimate 70 at a sparse eigensolver 60.

Applying the finite difference method to a quantum computing device model 20 discretized with a nonuniform grid 40 may result in a non-Hermitian Hamiltonian matrix that produces unphysical results when the finite-difference solution estimate 70 is computed. In order to avoid such unphysical results, the processor 12 may be configured to compute the finite-difference solution estimate 70 to the Schrödinger equation 50 at least in part by applying a scale transformation 62 based on the nonuniform grid 40 to the Schrödinger equation 50. In embodiments in which a sparse stencil matrix 64 is generated, the processor 12 may be configured to apply the scale transformation to the sparse stencil matrix 64. The processor 12 may apply the scale transformation 62 to each operator 54 included the Hamiltonian 52 of the Schrödinger equation. The scale transformation 62 may scale the cells of the nonuniform grid 40 such that the cells are treated as having a uniform size.

Subsequently to applying the scale transformation 62 to the sparse stencil matrix 64, the processor 12 may be further configured to compute a scale-modified solution estimate 66 at the sparse eigensolver 60. Computing the scale-modified solution estimate 66 may include diagonalizing the sparse stencil matrix 64. After the processor 12 has computed the scale-modified solution estimate 66, the processor 12 may be further configured to apply an inverse scale transformation 68 to the scale-modified solution estimate 66 to obtain the finite-difference solution estimate 70. The inverse scale transformation 68 may reverse the scale transformation 62 that was applied to the sparse stencil matrix 64. Thus, the inverse scale transformation 68 may return the scale-modified solution estimate 66 to the physical proportions of the quantum computing device model 20.

In embodiments in which the nonuniform grid 40 has a first spacing 42 of the first side 44 of an actual boundary 24 and a second spacing 46 of the second side 48, as in the example of FIG. 3, computing the finite-difference solution estimate 70 may include computing a first-side solution estimate 74 of the Schrödinger equation 50 on the first side 44 of the actual boundary 24. In such embodiments, when solving the Schrödinger equation 50 on the second side 48 of the actual boundary 24, computing the finite-difference solution estimate 70 may further include using the first-side solution estimate 74 of the Schrödinger equation 50 as a self-energy boundary condition. By using the first-side solution estimate 74 as a self-energy boundary condition, the processor 12 may replace the solution to the Schrödinger equation 50 for a region of the quantum computing device model 20 with an energy-dependent boundary condition.

The processor 12 may be further configured to compute a respective self-energy boundary condition for at least one change in the spacing of the nonuniform grid 40 that occurs within a quantum computing device component 22 rather than at an actual boundary 24. When a self-energy boundary condition is computed for a location internal to a quantum computing device component 22, the self-energy boundary condition may be a boundary condition for an operator 54 of the Hamiltonian 52 that is a function of at least one variable other than a spatial variable. In such embodiments, the self-energy boundary condition may be a boundary condition for a discrete-space matrix 54B.

In some embodiments, the processor 12 may be further configured to iteratively compute a plurality of self-energy boundary conditions for a respective plurality of regions of the quantum computing device model 20. Thus, the processor 12 may be configured to further subdivide a region of the quantum computing device model 20 that is already bounded with a self-energy boundary condition. In such embodiments, the processor 12 may compute an additional first-side solution estimate 74 that is used as a self-energy boundary condition for a subdivision of that region.

Figure 5:
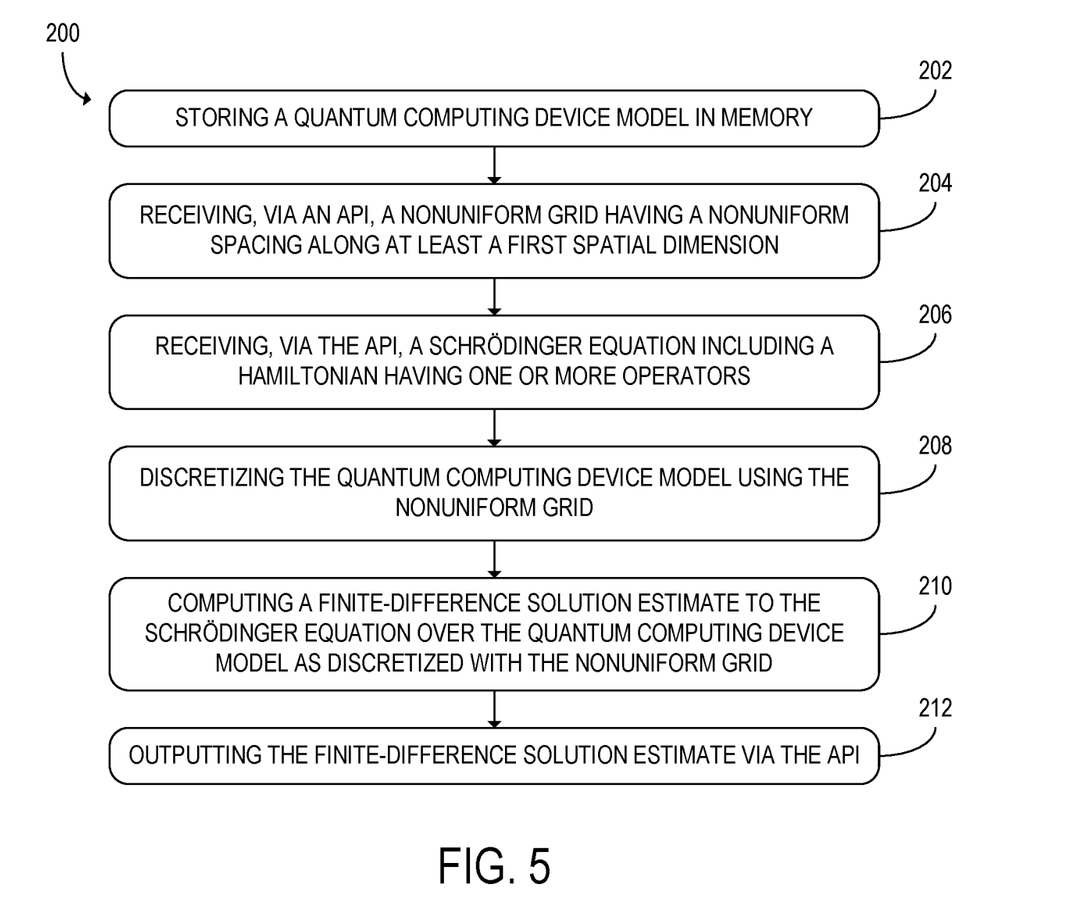
FIG. 5 shows a flowchart of an example method that may be used with a computing device, according to the embodiment of FIG. 1.

FIG. 5 shows a flowchart of a method 200 for use with a computing device, according to one example embodiment. The computing device may be the computing device 10 of FIG. 1. At step 202, the method 200 may include storing a quantum computing device model in memory. The quantum computing device model may be a two-dimensional model or a three-dimensional model. The quantum computing device model may include a plurality of quantum computing device components having a respective plurality of actual boundaries. The plurality of actual boundaries of the quantum computing device components may include a boundary between a superconductor and a semiconductor.

At step 204, the method 200 may further include receiving, via an API, a nonuniform grid having a nonuniform spacing along at least a first spatial dimension. The quantum computing device model may have one, two, or three spatial dimensions. In embodiments in which the quantum computing device model is a two-dimensional model, the nonuniform grid may be a nonuniform rectangular grid including a plurality of rectangular cells, and the nonuniform grid may be nonuniform along one or two spatial dimensions. When the quantum computing device model is a three-dimensional model, the nonuniform grid may be nonuniform along one, two, or three spatial dimensions. The nonuniform grid may have a spacing that varies according to a function selected from the group consisting of a step function, a linear function, an exponential function, and a logarithmic function. In other embodiments, other functions may be used for the spacing of the nonuniform grid.

At step 206, the method 200 may further include receiving, via the API, a Schrödinger equation including a Hamiltonian having one or more operators. The one or more operators may include a spatially varying scalar field, a discrete-space matrix, and a real-space finite difference operator. The discrete-space matrix may, for example, be a spin matrix or a particle-hole-space matrix. The real-space finite difference operator may be a gradient operator.

At step 208, the method 200 may further include discretizing the quantum computing device model using the nonuniform grid. Thus, the nonuniform grid may delineate regions of the quantum computing device model for which the Schrödinger equation is solved with different resolution levels. At step 210, the method 200 may further include computing a finite-difference solution estimate to the Schrödinger equation over the quantum computing device model as discretized with the nonuniform grid. The method 200 may further include, at step 212, outputting the finite-difference solution estimate via the API.

Figure 6:
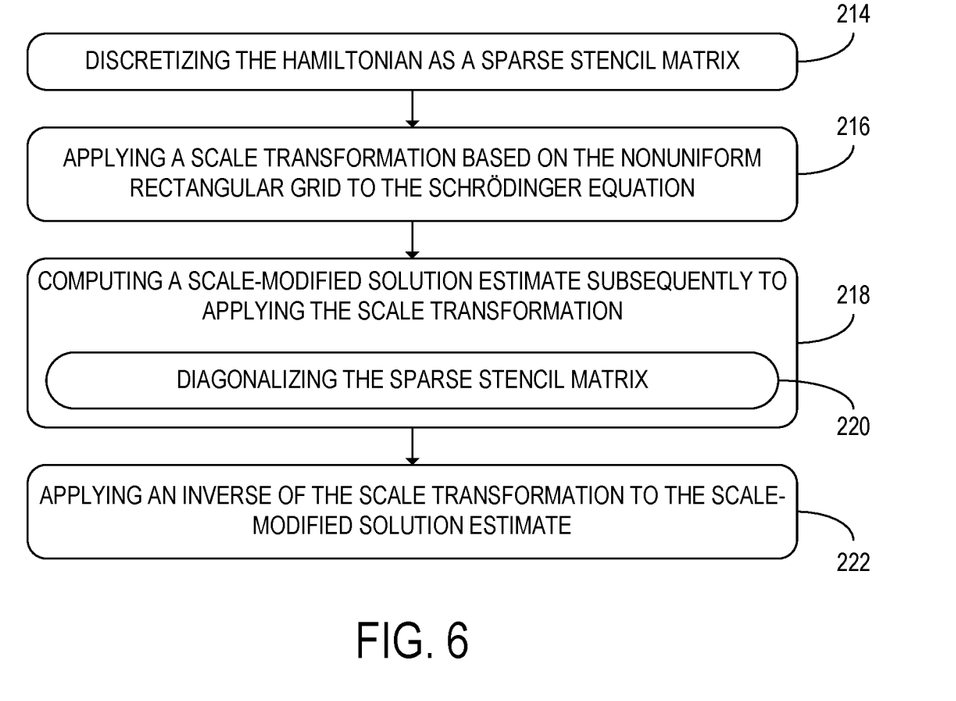
FIGS. 6 and 7 show additional steps of the method of FIG. 5 that may be performed in some embodiments.

FIG. 6 shows additional steps of the method 200 that may be performed in some embodiments when computing the finite-difference solution estimate at step 210. The method 200 may further include, at step 214, discretizing the Hamiltonian as a sparse stencil matrix. When the quantum computing device model is a two-dimensional model and the nonuniform grid is a nonuniform rectangular grid, the sparse stencil matrix may indicate a respective five-point stencil for each cell of the nonuniform rectangular grid. Alternatively, when the quantum computing device model is a three-dimensional model, the sparse stencil matrix may indicate a respective nine-point stencil for each cell.

At step 216, the method 200 may further include applying a scale transformation based on the nonuniform grid to the Schrödinger equation. The scale transformation may scale the plurality of operators included in the Hamiltonian such that after the scale transformation has been performed on the Hamiltonian, each cell of the scale-modified Hamiltonian has the same dimensions.

At step 218, the method 200 may further include computing a scale-modified solution estimate for the Schrödinger equation subsequently to applying the scale transformation. Computing the scale-modified solution estimate may include, at step 220, diagonalizing the sparse stencil matrix after the scale transformation has been applied to it. In order to restore the scale-modified cells of the nonuniform grid to the original proportions that they have in the quantum computing device model, the method 200 may further include, at step 222, applying an inverse of the scale transformation to the scale-modified solution estimate. Thus, the finite-difference solution estimate has the respective length scale specified by the nonuniform grid for each region of the quantum computing device model while maintaining the originally specified size and shape of each region.

Figure 7:
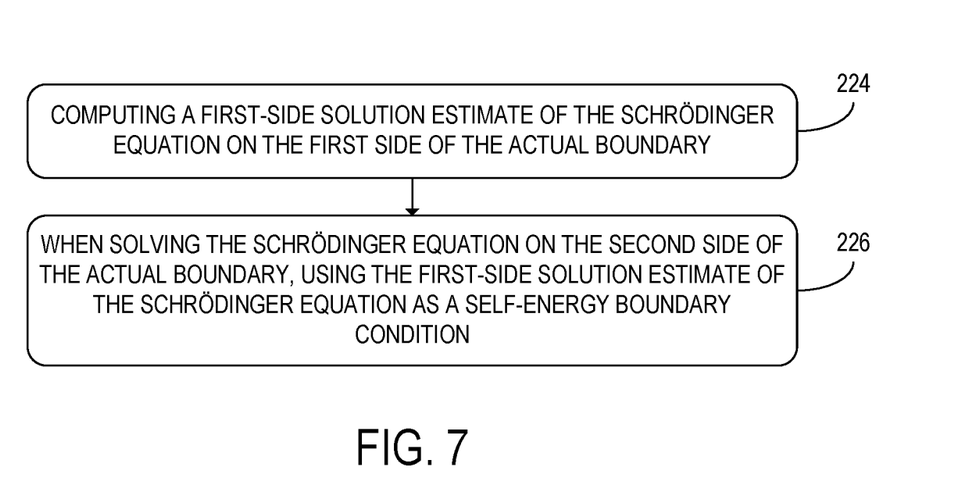

FIG. 7 shows additional steps of the method 200 that may be performed in some embodiments. The nonuniform grid may, in such embodiments, have a first spacing on a first side of an actual boundary of the plurality of actual boundaries. In addition, the nonuniform grid may have a second spacing on a second side of the actual boundary. The method 200 may further include, at step 224, computing a first-side solution estimate of the Schrödinger equation on the first side of the actual boundary. When solving the Schrödinger equation on the second side of the actual boundary, the method 200 may further include, at step 226, using the first-side solution estimate of the Schrödinger equation as a self-energy boundary condition. In some embodiments, a self-energy boundary condition may be computed for an internal boundary at which the spacing of the nonuniform grid changes, additionally or alternatively to an actual boundary.

Although the above systems and methods are described with reference to a quantum computing device model, the above systems and methods may also be used with a model of a computing device that is a superconducting computing device that includes a boundary between a superconductor and a semiconductor but is not a quantum computing device. For example, the above systems and methods may be used when modeling a rapid single flux quantum (RSFQ), inductor-resistor RSFQ, low voltage RSFQ, energy-efficient single flux quantum, reciprocal quantum logic, or adiabatic quantum flux parametron circuit. The above systems and methods may also be used when modeling other types of circuits that include superconductor-semiconductor interfaces.

With the systems and methods described above, a quantum computing device may be simulated more efficiently. By solving the Schrödinger equation as discretized with the nonuniform grid, the computing device may save computational resources that would otherwise be used performing high-resolution simulations of regions of the quantum computing device model for which increasing the resolution does not significantly increase the accuracy of the finite-difference solution estimate. Thus, by discretizing some regions of the quantum computing device model at finer length scales and others at coarser length scales, each quantum computing device component may be modeled at a level of detail that provides a physically accurate description of the behavior of that quantum computing device component without performing large amounts of wasted computation. In addition, the systems and methods described above allow a user to construct and solve finite-difference simulations of the quantum computing device model with Hamiltonians including operators that have structure along non-spatial dimensions in addition to spatial dimensions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
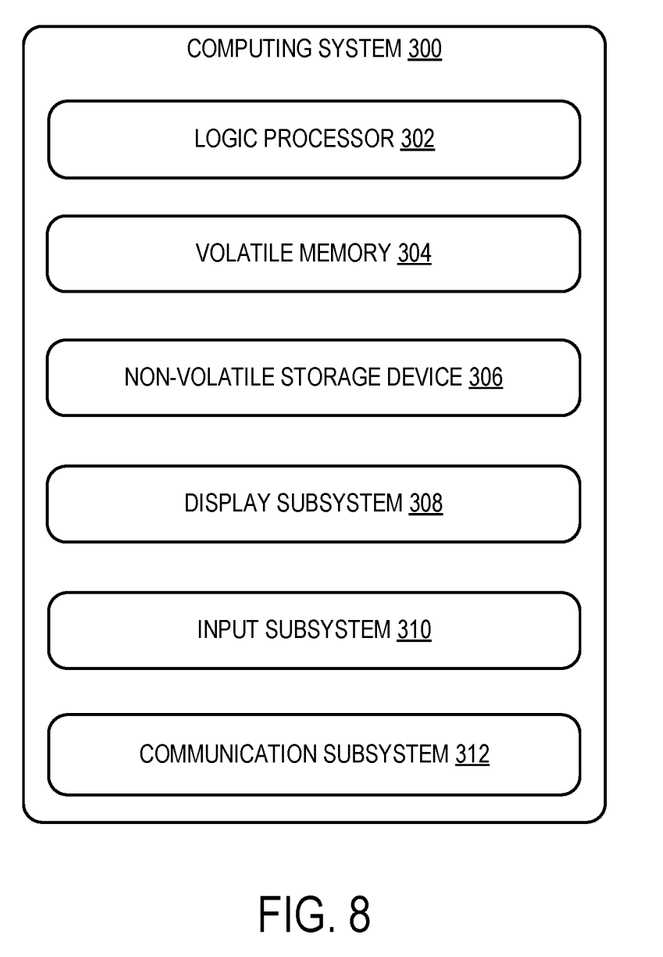
FIG. 8 shows a schematic view of an example computing environment in which the computing device of FIG. 1 may be enacted.

FIG. 8 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including memory storing a quantum computing device model. The quantum computing device model may include a plurality of quantum computing device components having a respective plurality of actual boundaries. The plurality of actual boundaries may include a boundary between a superconductor and a semiconductor. The computing device may further include a processor configured to receive, via an application-program interface (API), a nonuniform grid having a nonuniform spacing along at least a first spatial dimension. The processor may be further configured to receive, via the API, a Schrödinger equation including a Hamiltonian having one or more operators. The processor may be further configured to discretize the quantum computing device model using the nonuniform grid. The processor may be further configured to compute a finite-difference solution estimate to the Schrödinger equation over the quantum computing device model as discretized with the nonuniform grid. The processor may be further configured to output the finite-difference solution estimate via the API.

According to this aspect, the one or more operators may include a spatially varying scalar field, a discrete-space matrix, and a real-space finite difference operator. The Hamiltonian may be expressed as a product of the one or more operators.

According to this aspect, the nonuniform grid may have a first spacing on a first side of an actual boundary of the plurality of actual boundaries. The nonuniform grid may have a second spacing on a second side of the actual boundary.

According to this aspect, computing the finite-difference solution estimate may include computing a first-side solution estimate of the Schrödinger equation on the first side of the actual boundary. Computing the finite-difference solution estimate may further include using the first-side solution estimate of the Schrödinger equation as a self-energy boundary condition when solving the Schrödinger equation on the second side of the actual boundary.

According to this aspect, the Hamiltonian may be discretized as a sparse stencil matrix.

According to this aspect, computing the finite-difference solution estimate may include applying a scale transformation based on the nonuniform grid to the Schrödinger equation. Computing the finite-difference solution estimate may further include computing a scale-modified solution estimate subsequently to applying the scale transformation. Computing the finite-difference solution estimate may further include applying an inverse of the scale transformation to the scale-modified solution estimate.

According to this aspect, the quantum computing device model may be a two-dimensional model or a three-dimensional model.

According to this aspect, the nonuniform grid may be a nonuniform rectangular grid including a plurality of rectangular cells.

According to this aspect, the nonuniform grid may be uniform along at least a second spatial dimension.

According to this aspect, the nonuniform grid may have a spacing that varies according to a function selected from the group consisting of a step function, a linear function, an exponential function, and a logarithmic function.

According to another aspect of the present disclosure, a method for use with a computing device is provided. The method may include storing a quantum computing device model in memory. The quantum computing device model may include a plurality of quantum computing device components having a respective plurality of actual boundaries. The plurality of actual boundaries may include a boundary between a superconductor and a semiconductor. The method may further include receiving, via an application-program interface (API), a nonuniform grid having a nonuniform spacing along at least a first spatial dimension. The method may further include receiving, via the API, a Schrödinger equation including a Hamiltonian having one or more operators. The method may further include discretizing the quantum computing device model using the nonuniform grid. The method may further include computing a finite-difference solution estimate to the Schrödinger equation over the quantum computing device model as discretized with the nonuniform grid. The method may further include outputting the finite-difference solution estimate via the API.

According to this aspect, the one or more operators may include a spatially varying scalar field, a discrete-space matrix, and a real-space finite difference operator. The Hamiltonian may be expressed as a product of the one or more operators.

According to this aspect, the nonuniform grid may have a first spacing on a first side of an actual boundary of the plurality of actual boundaries. The nonuniform grid may have a second spacing on a second side of the actual boundary.

According to this aspect, computing the finite-difference solution estimate may include computing a first-side solution estimate of the Schrödinger equation on the first side of the actual boundary. Computing the finite-difference solution estimate may further include using the first-side solution estimate of the Schrödinger equation as a self-energy boundary condition when solving the Schrödinger equation on the second side of the actual boundary.

According to this aspect, the method may further include discretizing the Hamiltonian as a sparse stencil matrix.

According to this aspect, computing the finite-difference solution estimate to the Schrödinger equation may include applying a scale transformation based on the nonuniform grid to the Schrödinger equation. Computing the finite-difference solution estimate may further include computing a scale-modified solution estimate subsequently to applying the scale transformation. Computing the finite-difference solution estimate may further include applying an inverse of the scale transformation to the scale-modified solution estimate.

According to this aspect, the quantum computing device model may be a two-dimensional model or a three-dimensional model. The nonuniform grid may be uniform along at least a second spatial dimension.

According to this aspect, the nonuniform grid may be a nonuniform rectangular grid including a plurality of rectangular cells.

According to this aspect, the nonuniform grid may have a spacing that varies according to a function selected from the group consisting of a step function, a linear function, an exponential function, and a logarithmic function.

According to another aspect of the present disclosure, a computing device is provided, including memory storing a computing device model. The computing device model may include a plurality of computing device components having a respective plurality of actual boundaries. The plurality of actual boundaries may include a boundary between a superconductor and a semiconductor. The computing device may further include a processor configured to receive, via an application-program interface (API), a nonuniform rectangular grid having a nonuniform spacing along at least a first spatial dimension. The processor may be further configured to receive, via the API, a Schrödinger equation including a Hamiltonian having one or more operators. The processor may be further configured to discretize the computing device model using the nonuniform rectangular grid. The processor may be further configured to compute a finite-difference solution estimate to the Schrödinger equation over the computing device model as discretized with the nonuniform rectangular grid. Computing the finite-difference solution estimate may include discretizing the Schrödinger equation as a sparse stencil matrix. Computing the finite-difference solution estimate may further include applying a scale transformation to the sparse stencil matrix. Computing the finite-difference solution estimate may further include diagonalizing the sparse stencil matrix. Computing the finite-difference solution estimate may further include applying an inverse of the scale transformation to the diagonalized sparse stencil matrix. The processor may be further configured to output the finite-difference solution estimate via the API.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   memory storing a quantum computing device model, wherein:

the quantum computing device model includes a plurality of quantum computing device components having a respective plurality of actual boundaries; and the plurality of actual boundaries includes a boundary between a superconductor and a semiconductor; and a processor configured to:
receive, via an application-program interface (API), a nonuniform grid having a nonuniform spacing along at least a first spatial dimension;
receive, via the API, a Schrödinger equation including a Hamiltonian having one or more operators;
discretize the quantum computing device model using the nonuniform grid;
compute a finite-difference solution estimate to the Schrödinger equation over the quantum computing device model as discretized with the nonuniform grid; and
output the finite-difference solution estimate via the API.

2. The computing device of claim 1, wherein:
the one or more operators include a spatially varying scalar field, a discrete-space matrix, and a real-space finite difference operator; and
the Hamiltonian is expressed as a product of the one or more operators.

3. The computing device of claim 1, wherein:
the nonuniform grid has a first spacing on a first side of an actual boundary of the plurality of actual boundaries; and
the nonuniform grid has a second spacing on a second side of the actual boundary.

4. The computing device of claim 3, wherein computing the finite-difference solution estimate includes:
computing a first-side solution estimate of the Schrödinger equation on the first side of the actual boundary; and
when solving the Schrödinger equation on the second side of the actual boundary, using the first-side solution estimate of the Schrödinger equation as a self-energy boundary condition.

5. The computing device of claim 1, wherein the Hamiltonian is discretized as a sparse stencil matrix.

6. The computing device of claim 1, wherein computing the finite-difference solution estimate includes:
applying a scale transformation based on the nonuniform grid to the Schrödinger equation;
computing a scale-modified solution estimate subsequently to applying the scale transformation; and
applying an inverse of the scale transformation to the scale-modified solution estimate.

7. The computing device of claim 1, wherein the quantum computing device model is a two-dimensional model or a three-dimensional model.

8. The computing device of claim 7, wherein the nonuniform grid is a nonuniform rectangular grid including a plurality of rectangular cells.

9. The computing device of claim 7, wherein the nonuniform grid is uniform along at least a second spatial dimension.

10. The computing device of claim 1, wherein the nonuniform grid has a spacing that varies according to a function selected from the group consisting of a step function, a linear function, an exponential function, and a logarithmic function.

11. A method for use with a computing device, the method comprising:
storing a quantum computing device model in memory, wherein:
the quantum computing device model includes a plurality of quantum computing device components having a respective plurality of actual boundaries; and
the plurality of actual boundaries includes a boundary between a superconductor and a semiconductor;
receiving, via an application-program interface (API), a nonuniform grid having a nonuniform spacing along at least a first spatial dimension;
receiving, via the API, a Schrödinger equation including a Hamiltonian having one or more operators;
discretizing the quantum computing device model using the nonuniform grid;
computing a finite-difference solution estimate to the Schrödinger equation over the quantum computing device model as discretized with the nonuniform grid; and
outputting the finite-difference solution estimate via the API.

12. The method of claim 11, wherein:
the one or more operators include a spatially varying scalar field, a discrete-space matrix, and a real-space finite difference operator; and
the Hamiltonian is expressed as a product of the one or more operators.

13. The method of claim 11, wherein:
the nonuniform grid has a first spacing on a first side of an actual boundary of the plurality of actual boundaries; and
the nonuniform grid has a second spacing on a second side of the actual boundary.

14. The method of claim 13, wherein computing the finite-difference solution estimate includes:
computing a first-side solution estimate of the Schrödinger equation on the first side of the actual boundary; and
when solving the Schrödinger equation on the second side of the actual boundary, using the first-side solution estimate of the Schrödinger equation as a self-energy boundary condition.

15. The method of claim 11, further comprising discretizing the Hamiltonian as a sparse stencil matrix.

16. The method of claim 11, wherein computing the finite-difference solution estimate to the Schrödinger equation includes:
applying a scale transformation based on the nonuniform grid to the Schrödinger equation;
computing a scale-modified solution estimate subsequently to applying the scale transformation; and
applying an inverse of the scale transformation to the scale-modified solution estimate.

17. The method of claim 11, wherein:
the quantum computing device model is a two-dimensional model or a three-dimensional model; and
the nonuniform grid is uniform along at least a second spatial dimension.

18. The method of claim 17, wherein the nonuniform grid is a nonuniform rectangular grid including a plurality of rectangular cells.

19. The method of claim 11, wherein the nonuniform grid has a spacing that varies according to a function selected from the group consisting of a step function, a linear function, an exponential function, and a logarithmic function.

20. A computing device comprising:
  memory storing a computing device model, wherein:
    the computing device model includes a plurality of computing device components having a respective plurality of actual boundaries; and
    the plurality of actual boundaries includes a boundary between a superconductor and a semiconductor; and
  a processor configured to:
    receive, via an application-program interface (API), a nonuniform rectangular grid having a nonuniform spacing along at least a first spatial dimension; and
    receive, via the API, a Schrödinger equation including a Hamiltonian having one or more operators;
    discretize the computing device model using the nonuniform rectangular grid;
    compute a finite-difference solution estimate to the Schrödinger equation over the computing device model as discretized with the nonuniform rectangular grid, wherein computing the finite-difference solution estimate includes:
      discretizing the Schrödinger equation as a sparse stencil matrix;
      applying a scale transformation to the sparse stencil matrix;
      diagonalizing the sparse stencil matrix; and
      applying an inverse of the scale transformation to the diagonalized sparse stencil matrix; and
    output the finite-difference solution estimate via the API.

* * * * *